(12) United States Patent
Miyajima

(10) Patent No.: US 8,668,769 B2
(45) Date of Patent: Mar. 11, 2014

(54) WATER-BASED INK FOR INK-JET RECORDING, INK-JET RECORDING METHOD AND INK-JET RECORDING APPARATUS

(75) Inventor: Akiko Miyajima, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 308 days.

(21) Appl. No.: 13/289,338

(22) Filed: Nov. 4, 2011

(65) Prior Publication Data

US 2012/0113185 A1     May 10, 2012

(30) Foreign Application Priority Data

Nov. 5, 2010    (JP) ................................. 2010-249035

(51) Int. Cl.
     *C09D 11/02*     (2006.01)

(52) U.S. Cl.
     USPC ...................................................... 106/31.47

(58) Field of Classification Search
     USPC ................................. 106/31.47; 347/20, 100
     See application file for complete search history.

(56) References Cited

U.S. PATENT DOCUMENTS

| 5,354,369 | A | 10/1994 | Shimomura et al. | |
| 7,270,701 | B2* | 9/2007 | Jinnou et al. ................ | 106/31.47 |
| 7,611,571 | B2* | 11/2009 | Yamashita et al. .......... | 106/31.47 |
| 7,713,343 | B2* | 5/2010 | Goto et al. .................. | 106/31.49 |
| 7,854,797 | B2* | 12/2010 | Fujii et al. ................... | 106/31.47 |
| 8,430,953 | B2* | 4/2013 | Hayashida et al. ......... | 106/31.47 |
| 8,460,449 | B2* | 6/2013 | Goto et al. .................. | 106/31.47 |
| 2007/0186806 | A1 | 8/2007 | Goto et al. | |
| 2008/0241398 | A1 | 10/2008 | Kato et al. | |
| 2009/0151599 | A1* | 6/2009 | Fujii et al. ................... | 106/31.47 |
| 2009/0202798 | A1* | 8/2009 | Patel ........................... | 106/31.47 |
| 2010/0112218 | A1* | 5/2010 | Fujii et al. ................... | 106/31.47 |
| 2011/0032302 | A1* | 2/2011 | Kajiura et al. ................ | 347/20 |
| 2012/0081453 | A1* | 4/2012 | Tsuzaka et al. .............. | 347/20 |
| 2012/0081454 | A1* | 4/2012 | Ito et al. ......................... | 347/20 |

FOREIGN PATENT DOCUMENTS

| JP | 06-025575 | 2/1994 |
| JP | 10-060330 | 3/1998 |
| JP | 2002-234248 | 8/2002 |
| JP | 2004-067903 | 3/2004 |
| JP | 2006-111755 | 4/2006 |
| JP | 2007-217531 | 8/2007 |
| JP | 2008-246821 | 10/2008 |

\* cited by examiner

*Primary Examiner* — Helene Klemanski
(74) *Attorney, Agent, or Firm* — Banner & Witcoff, Ltd.

(57) ABSTRACT

A water-based ink for ink jet recording includes water; a water-soluble organic solvent; alcoholamine which is contained at 0.2% by weight to 0.75% by weight in the water-based ink for ink-jet recording; an anionic surfactant having a sulfate structure which is contained at 0.02% by weight to 0.2% by weight in the water-based ink for ink jet recording; and a colorant including a dye represented by general formula (1).

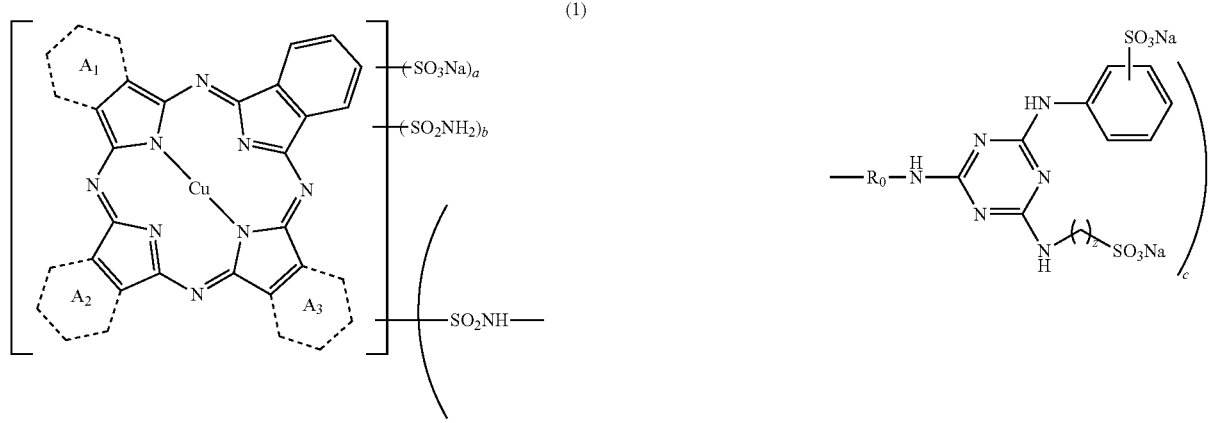
-continued
9 Claims, 1 Drawing Sheet

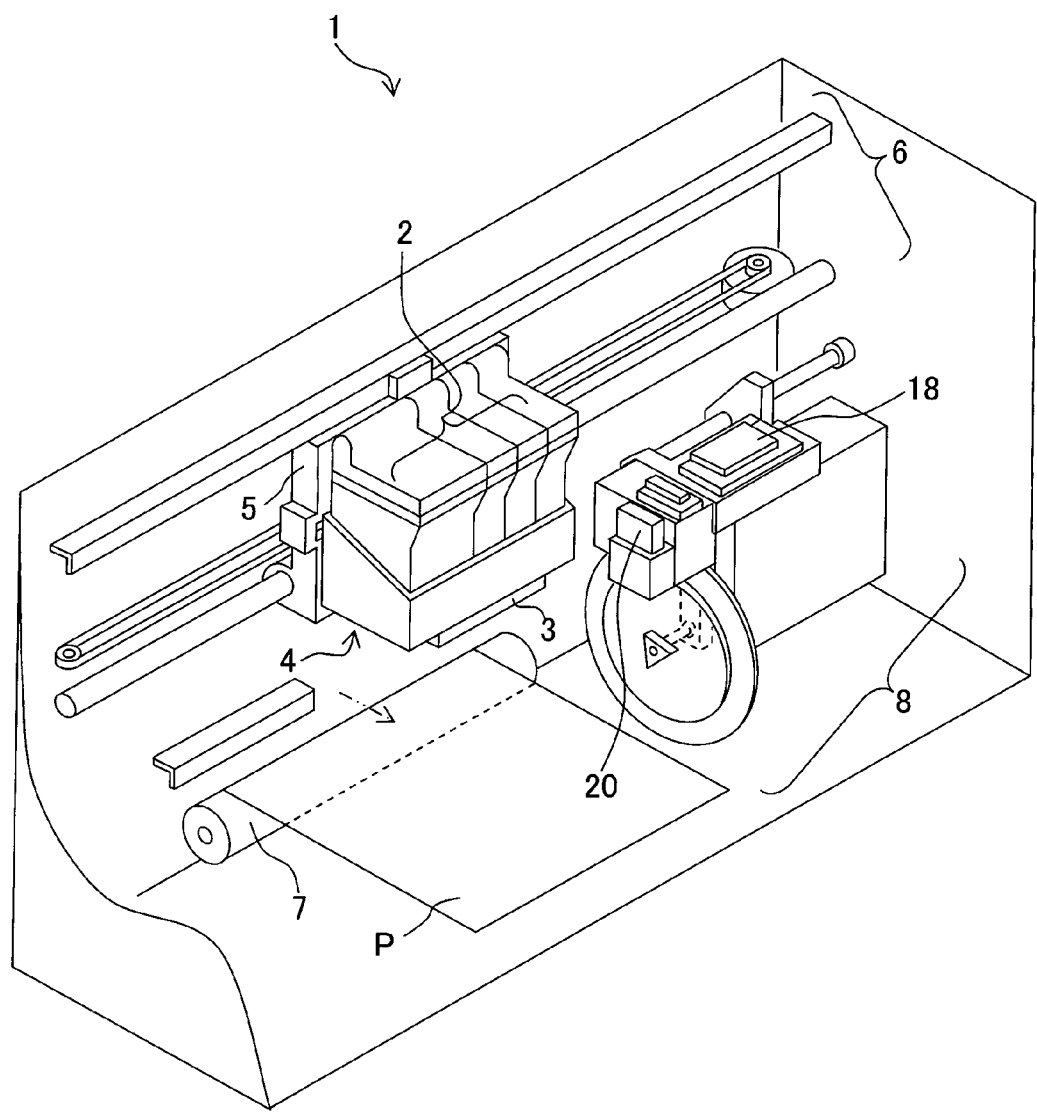

WATER-BASED INK FOR INK-JET RECORDING, INK-JET RECORDING METHOD AND INK-JET RECORDING APPARATUS

CROSS REFERENCE TO RELATED APPLICATION

The present application claims priority from Japanese Patent Application No. 2010-249035 filed on Nov. 5, 2010 the disclosure of which is incorporated herein by reference in its entirety.

BACKGROUND OF THE INVENTION

1. Field of the Invention

The present invention relates to a water-based ink for ink jet recording, an ink jet recording method and an ink jet recording apparatus.

2. Description of the Related Art

In an ink-jet recording using a water-based ink, the reflectance of light partially varies on a recorded image and a so-called "bronzing phenomenon (bronze phenomenon)", in which a metal-like gloss is observed depending on an observation angle for observing the recorded image, occurs in some cases. When the bronzing phenomenon occurs, the color balance as the entire recorded image is degraded, which in turn lowers the image quality of the recorded image.

In order to suppress the occurrence of the bronzing phenomenon, there is proposed an ink in which an amine compound such as an urea derivative is blended. Further, in order to suppress the occurrence of the bronzing phenomenon, there is proposed an ink in which a polycyclic aromatic hetero conjugated compound having a plurality of aromatic rings.

With the ink in which the urea derivative is blended, however, the suppression of the bronzing phenomenon is not sufficient. Further, with the ink in which the polycyclic aromatic hetero conjugated compound is blended, there is a fear that the conjugated system of the polycyclic aromatic hetero conjugated compound might change the absorption wavelength of dye and consequently might affect the color of a recorded image.

In view of these situations, an object of the present teaching is to provide a water-based ink for ink-jet recording capable of sufficiently suppressing the occurrence of bronzing phenomenon without affecting the color of a recorded image.

SUMMARY OF THE INVENTION

According to a first aspect of the present teaching, there is provided a water-based ink for ink jet recording, including:
water;
a water-soluble organic solvent;
alcoholamine which is contained at 0.2% by weight to 0.75% by weight in the water-based ink for ink jet recording;
an anionic surfactant having a sulfate structure which is contained at 0.02% by weight to 0.2% by weight in the water-based ink for ink jet recording; and
a colorant including a dye represented by general formula (1):

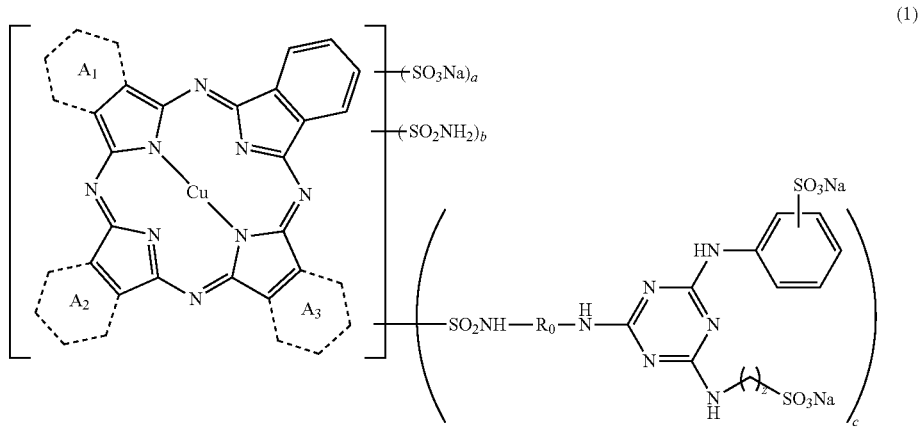

wherein each of rings $A_1$, $A_2$ and $A_3$ is a benzene ring, 2,3-pyridine ring or 3,2-pyridine ring;
at least one of the rings $A_1$, $A_2$ and $A_3$ is the 2,3-pyridine ring or the 3,2-pyridine ring, and the rings $A_1$, $A_2$ and $A_3$ are identical to or different from one another;
"a" satisfies $0 \leq a \leq 4$, "b" satisfies $0 \leq b \leq 4$ and "c" satisfies $0 \leq c \leq 4$, and a sum of "a", "b", "c" satisfies $0 \leq a+b+c \leq 4$;
"z" is an integer satisfying $1 \leq z \leq 3$; and
$R_0$ is a straight chain alkyl group having 1 to 6 carbon atoms.

According to a second aspect of the present teaching, there is provided an ink jet recording method for performing recording on a recording medium, the method including: providing the water-based ink for ink-jet recording of the first aspect; and discharging, to the recording medium, the water-based ink.

According to a third aspect of the present teaching, there is provided an ink-jet recording apparatus which performs recording on a recording medium, the apparatus including: an ink accommodating section which accommodates the water-based ink for ink jet recording of the first aspect therein; and an ink discharge mechanism which discharges, to the recording medium, the water-based ink for ink jet recording accommodated in the ink accommodating section.

BRIEF DESCRIPTION OF THE DRAWINGS

FIG. 1 is a schematic perspective view of exemplary construction of an ink jet recording apparatus of the present teaching.

DESCRIPTION OF THE PREFERRED EMBODIMENTS

An explanation will be given about a water-based ink for ink-jet recording (hereinafter also referred to simply as "water-based ink" or "ink") of the present teaching. The water-based ink of the present teaching includes a colorant, water and a water-soluble organic solvent. The colorant includes a dye represented by the general formula (1). By using the dye represented by the general formula (1) as the colorant and by using the alcoholamine and the anionic surfactant having the sulfate structure (to be described later on) in combination with the dye represented by the general formula (1), it is possible to obtain a water-based ink capable of sufficiently suppressing the occurrence of the bronzing phenomenon. Further, since the water-based ink of the present teaching does not use the polycyclic aromatic hetero conjugated compound, the water-based ink of the present teaching does not affect the color of the recorded image.

The dye represent by the general formula (1) may be a compound in which all of the rings $A_1$, $A_2$, and $A_3$ are 2,3-pyridine ring or 3,2-pyridine ring; may be a compound in which two of the rings $A_1$, $A_2$, and $A_3$ are the 2,3-pyridine ring or the 3,2-pyridine ring, and the remaining one of the rings $A_1$, $A_2$, $A_3$ is a benzene ring; and may be a compound in which one of the rings $A_1$, $A_2$, and $A_3$ is the 2,3-pyridine ring or the 3,2-pyridine ring, and the remaining two of the rings $A_1$, $A_2$, $A_3$ are the benzene ring. The dye represented by the general formula (1) may be composed singly one of the above-described compounds, or may be a mixture containing not less than two kinds of the above-described compounds.

The dye represented by the general formula (1) is such a dye that "a", "b" and "c" in the general formula (1) satisfy $0 \leq a \leq 4$, $0 \leq b \leq 4$, $0 \leq c \leq 4$, respectively, and the sum of "a", "b", "c" satisfies $0 \leq a+b+c \leq 4$; further, it is preferable that "a", "b" and "c" in the general formula (1) satisfy $1.0 \leq a \leq 3.0$, $0.2 \leq b \leq 1.8$, $0.8 \leq c \leq 1.6$, respectively, and the sum of "a", "b", "c" satisfies $a+b+c=4$. Note that in a case that a mixture containing two or more kinds of the compounds, it is preferable that the average values of "a", "b" and "c" in the mixture satisfy the above-specified range.

A specific and preferable example of the dye represented by the general formula (1) is exemplified by the following compounds represented by chemical formulae (1-A) to (1-E).

(Chemical Formula 1-A)

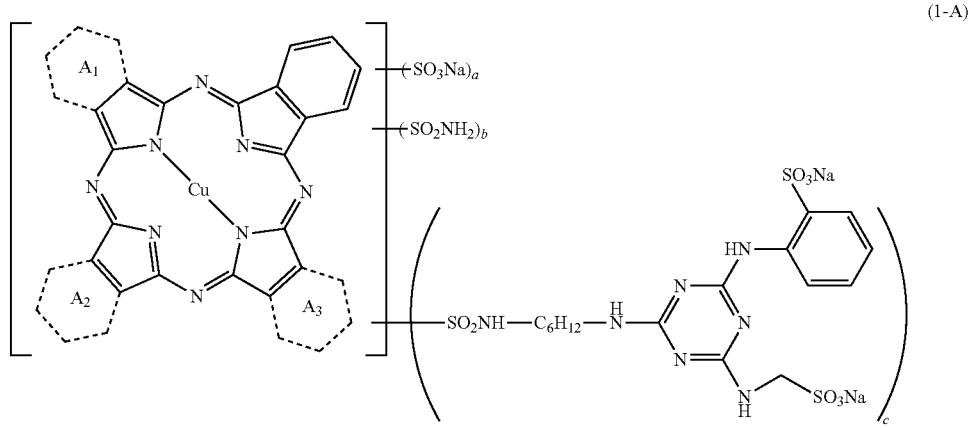

(1-A)

In the chemical formula (1-A), each of rings $A_1$, $A_2$ and $A_3$ is independently a 2,3-pyridine ring and/or a 3,2-pyridine ring; and "a" is 1.0, "b" is 1.8, "c" is 1.2, and each of the "a", "b", "c" is an average value in a mixture.

(Chemical Formula 1-B)

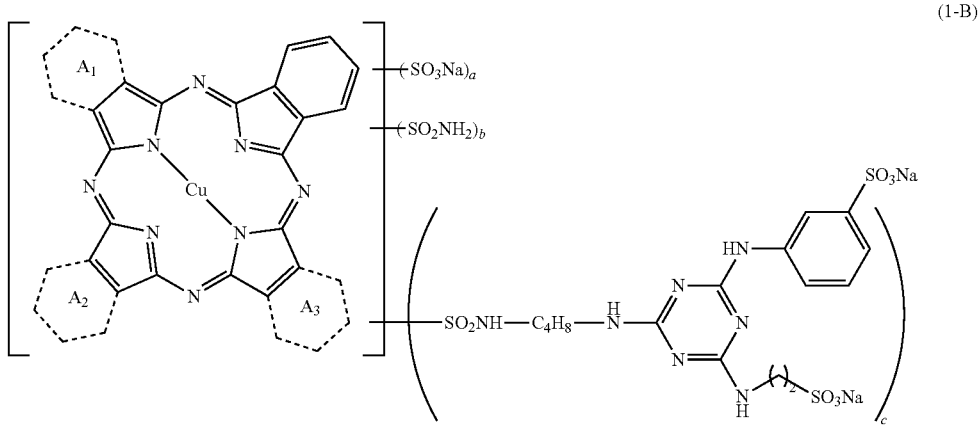

(1-B)

In the chemical formula (1-B), each of rings $A_1$ and $A_2$ is independently a 2,3-pyridine ring and/or a 3,2-pyridine ring; ring $A_3$ is a benzene ring; and "a" is 2.4, "b" is 0.6, "c" is 1.0, and each of the "a", "b", "c" is an average value in a mixture.

(Chemical Formula 1-C)

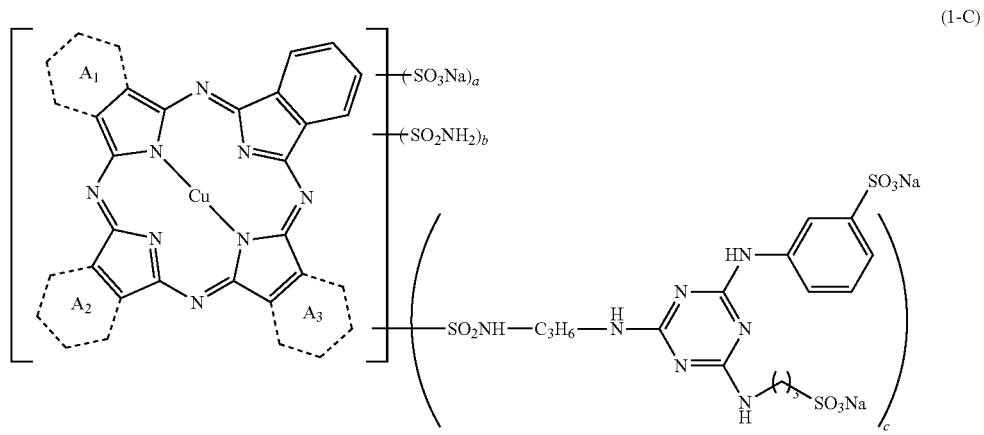

(1-C)

In the chemical formula (1-C), each of rings $A_1$, $A_2$ and $A_3$ is independently a 2,3-pyridine ring and/or a 3,2-pyridine ring; and "a" is 3.0, "b" is 0.2, "c" is 0.8, and each of the "a", "b", "c" is an average value in a mixture.

(Chemical Formula 1-D)

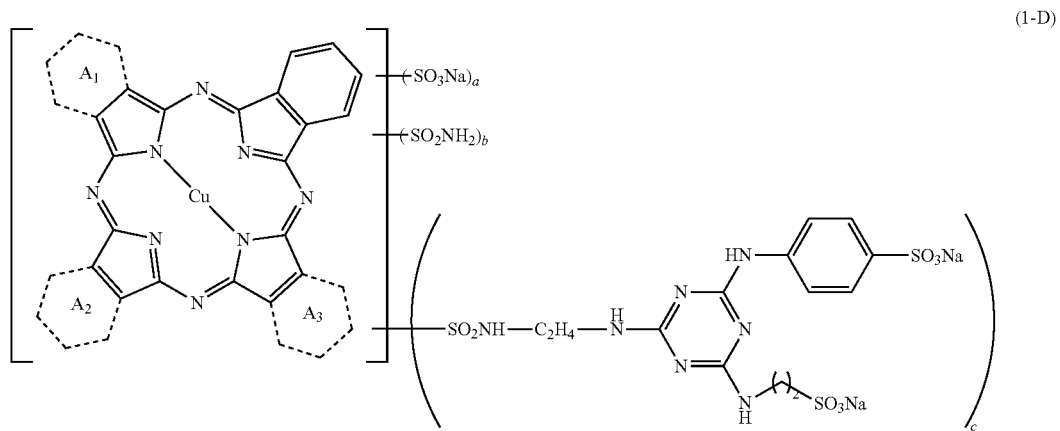

(1-D)

In the chemical formula (1-D), a ring $A_1$ is a benzene ring; each of rings $A_2$ and $A_3$ is independently a 2,3-pyridine ring and/or a 3,2-pyridine ring; and "a" is 1.8, "b" is 0.9, "c" is 1.3, and each of the "a", "b", "c" is an average value in a mixture.

(Chemical Formula 1-E)

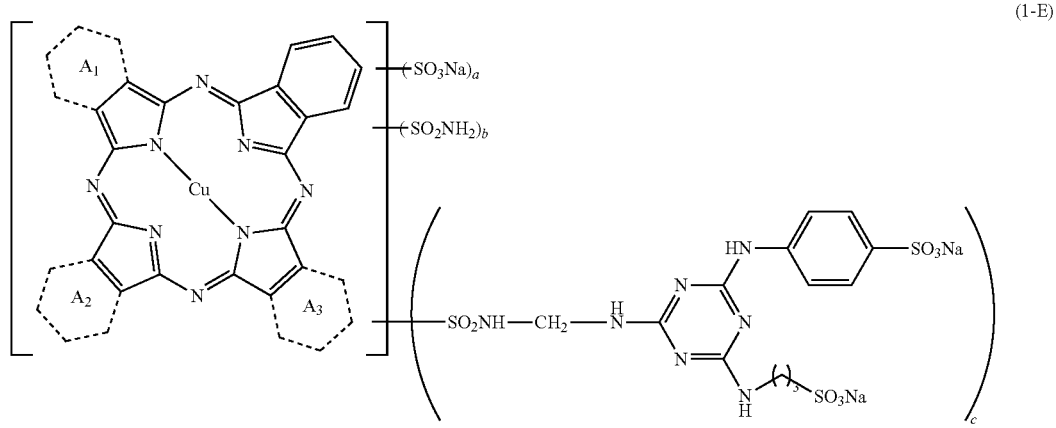

(1-E)

In the chemical formula (1-E), each of rings $A_1$, $A_2$, and $A_3$ is independently a 2,3-pyridine ring and/or a 3,2-pyridine ring; and "a" is 1.1, "b" is 1.3, "c" is 1.6, and each of the "a", "b", "c" is an average value in a mixture.

The dye represented by the general formula (1) may be produced according to a conventionally known method. An example of the method for producing the dye represented by the general formula (1) is as follows.

That is, first, a copper porphyrazine compound represented by the following structural formula (11) is synthesized. The copper porphyrazine compound represented by the structural formula (11) is obtained, for example, by reaction of a nitrogen-containing heteroaromatic ring (at least one of a 2,3-pyridine ring and a 3,2-pyridine ring) dicarboxylic acid derivative and a phthalic acid derivative in the presence of a catalyst and a copper compound. By changing the molar ratio in the reaction of the nitrogen-containing heteroaromatic ring dicarboxylic acid derivative and the phthalic acid derivative, it is possible to adjust the number of nitrogen-containing heteroaromatic rings and the number of benzene rings in $A_1$, $A_2$, and $A_3$. The nitrogen-containing heteroaromatic ring dicarboxylic acid derivative is exemplified by a 6-membered nitrogen-containing heteroaromatic ring dicarboxylic acid derivative having, at adjacent two positions, carboxyl groups or reactive groups derived therefrom (for example, an acid amide group, an imide group, an acid anhydride group, a carbonitrile group, and the like), etc. Examples of the method for synthesizing the copper porphyrazine compound include conventionally known methods such as the nitrile method, the Wyler method, and the like.

(Chemical Structural Formula 11)

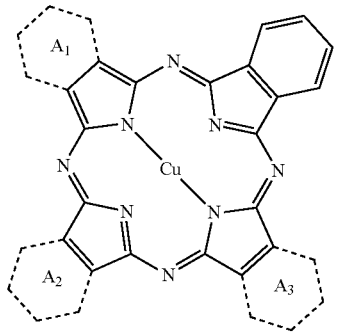

(11)

Next, a copper chlorosulfonylporphyrazine compound represented by the following structural formula (12) can be obtained by chlorosulfonation of the copper porphyrazine compound represented by the structural formula (11) in chlorosulfonic acid or by sulfonation of the copper porphyrazine compound represented by the structural formula (11) in sulfuric acid or fuming sulfuric acid followed by conversion of the sulfo group into a chlorosulfone group with a chlorinating agent.

(Chemical Structural Formula 12)

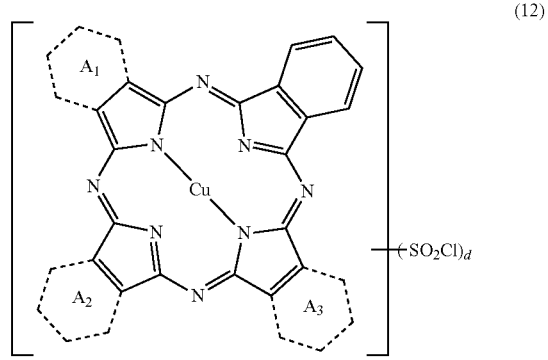

(12)

Next, the dye represented by the general formula (1) can be obtained by reaction of the thus obtained copper chlorosulfonylporphyrazine compound and organic amine represented by the following structural formula (13) in the presence of an aminating agent (ammonia or an ammonia generating compound) in an aqueous solvent under reaction conditions in which the pH is from about 8 to about 10, the temperature is from about 5° C. to about 70° C., and the reaction time is from about 1 hour to about 20 hours. As the aminating agent, ammonia or a compound that generates ammonia at the time of the reaction (ammonia generating compound) may be used. Examples thereof include ammonium salts such as ammonium chloride, ammonium sulfate, and the like; urea; ammonia water; ammonia gas; and the like. In the organic amine represented by the structural formula (13), "X" and "Y" each represent a hydrogen atom or sodium. "X" and "Y" each may be ionized in the aqueous solvent (may become $H^+$ or $Na^+$). The organic amine may be produced by a conventionally known method.

(Chemical Structural Formula 13)

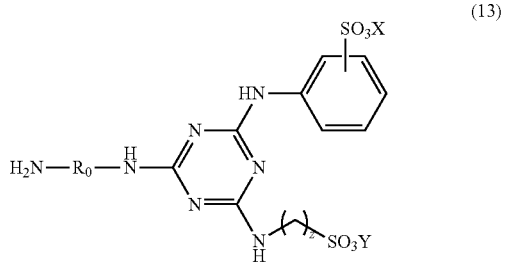

(13)

The thus obtained dye represented by the general formula (1) may be separated by filtration or the like after aciding out or salting out. Salting out may be carried out, for example, under acidic to alkali conditions preferably at a pH from about 1 to about 11. The temperature in salting out is not particularly limited, however is, for example, about 40° C. to about 80° C. and preferably about 50° C. to about 70° C.

The dye represented by the general formula (1) synthesized in the manner described above is obtained in a free acid form or a salt form thereof. The free acid form is obtained, for example, by aciding out. The salt form is obtained, for example, by salting out or by applying a typical salt exchange method of adding a desired organic or inorganic base to the free acid form.

The blending amount of the dye represented by the general formula (1) (dye ratio) with respect to the entire amount of the water-based ink is not particularly limited. However, the dye ratio is preferably not more than 5% by weight with respect to the entire amount of the water-based ink. By making the dye ratio be not more than 5% by weight, it is possible to lower the cost without hindering the effect of suppressing the bronzing phenomenon. The dye ratio is preferably 2% by weight to 5% by weight, and is more preferably 2% by weight to 4.5% by weight. Note that the term "dye ratio" means, for example, in a case that the dye represented by the general formula (1) is blended as an aqueous solution of the dye represented by the general formula (1), an amount of the dye represented by the general formula (1) itself, excluding the water.

The colorant may be composed only of the dye represented by the general formula (1), or may include a pigment, a dye, etc. which is/are different from the dye represented by the general formula (1), in addition to the dye represented by the general formula (1), within a range in which the effect of the present teaching is not deteriorated.

The water is preferably ion-exchanged water or pure water (purified water). The blending amount of water (water ratio) with respect to the entire amount of the water-based ink is, for example, 10% by weight to 90% by weight, and is preferably 40% by weight to 80% by weight. The water ratio may be, for example, the balance of the ink, excluding the other components.

The water-soluble organic solvent used in the water-based ink includes, for example, a humectant which prevents the water-based ink from drying at an end of the nozzle in the ink-jet head and a penetrant which adjusts the drying speed of the water-based ink on a recording medium.

The humectant is not particularly limited, and includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyvalent (polyhydric) alcohols such as polyalkylene glycol, alkylene glycol, and glycerol; 2-pyrrolidone; N-methyl-2-pyrrolidone; and 1,3-dimethyl-2-imidazolidinone. The polyalkylene glycol is not limited, and includes, for example, polyethylene glycol and polypropylene glycol. The alkylene glycol is not limited, and includes, for example, ethylene glycol, propylene glycol, butylene glycol, diethylene glycol, triethylene glycol, dipropylene glycol, tripropylene glycol, thiodiglycol, and hexylene glycol. It is allowable that only one kind of the humectant as described above is used, or two or more kinds of the humectants are used in combination. Among the above-described humectants, it is preferable to use polyvalent alcohols such as alkylene glycol, glycerol, etc.

The blending amount of the humectant with respect to the entire amount of the water-based ink is, for example, 0% by weight to 95% by weight, is preferably 5% by weight to 80% by weight, and is more preferably 5% by weight to 50% by weight.

The penetrant is not limited, and includes, for example, glycol ether. The glycol ether is not limited, and includes, for example, ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. It is allowable that only one kind of the penetrant as described above is used, or two or more kinds of the penetrants are used in combination.

The blending amount of the penetrant with respect to the entire amount of the water-based ink is, for example, 0% by weight to 20% by weight, is preferably 0.1% by weight to 15% by weight, and is more preferably 0.5% by weight to 10% by weight.

As described above, the water-based ink includes the alcoholamine, and the anionic surfactant having the sulfate structure. By using, in particular, the alcoholamine among the amine compounds and by using, in combination with the alcoholamine, the anionic surfactant having the sulfate structure and the dye represented by the general formula (1), it is possible to obtain the water-based ink capable of sufficiently suppressing the occurrence of the bronzing phenomenon.

Examples of the alcoholamine include triethanolamine, diethanolamine, monoethanolamine, trimethanolamine, dimethanolamine, monomethanolamine, propanolamine, etc.; from the view of safety (not being corrosive) and cost, the alcoholamine is preferably triethanolamine, diethanolamine and monoethanolamine and is more preferably triethanolamine and diethanolamine. The alcoholamine may be used singly. Alternatively, two or more kinds of the alcoholamines as described above may be used in combination.

The blending amount of the alcoholamine (alcoholamine ratio) is 0.2% by weight to 0.75% by weight with respect to the entire amount of the water-based ink. By making the alcoholamine ratio be not less than 0.2% by weight in the water-based ink containing the anionic surfactant having the sulfate structure, it is possible to further suppress the occurrence of the bronzing phenomenon. Further, by making the alcoholamine ratio be not more than 0.75% by weight, it is possible to obtain a water-based ink excellent in fluidity after evaporation. In the present teaching, the term "fluidity after evaporation" or "after-evaporation fluidity" means, for example, a fluidity of the water-based ink obtained after the water-based ink is made to be evaporated inside an open vial (open container) and then the open vial is inclined. When the after-evaporation fluidity is not satisfactory, for example, in a case that the water-based ink is left to remain in an ink-jet head for a predetermined period of time and has evaporated, then the fluidity is lost, which in turn causes discharge failure.

As the anionic surfactant having the sulfate structure, it is allowable to use any anionic surfactant having the sulfate structure (—$SO_3M$, M is a counter ion other than hydrogen atom), and to use a commercially available product. Examples of the commercially available product include "SUNNOL (trade name) NL1430", "LIPON (trade name) LT-270", "LIPON (trade name) LS-250" and "SUNNOL (trade name) LM-1130" which are produced by Lion Corporation; "PELEX (trade name) TR" produced by Kao Corporation; and the like.

The blending amount of the anionic surfactant having the sulfate structure (surfactant ratio) is 0.02% by weight to 0.2% by weight with respect to the entire amount of the water-based ink. By making the surfactant ratio within the range of 0.02% by weight to 0.2% by weight in the water-based ink containing the alcoholamine, it is possible to further suppress the occurrence of the bronzing phenomenon. Note that the term "surfactant ratio" means, for example, in a case that the anionic surfactant having the sulfate structure is used as an aqueous solution of the anionic surfactant having the sulfate structure, an amount of the anionic surfactant having the sulfate structure itself, excluding the water.

Since the bronzing phenomenon occurs due to the association of the dye contained in the water-based ink, it is necessary to inhibit the association of the dye in order to suppress the bronzing phenomenon. The nitrogen-containing compounds are known as reagents suppressing the association of the dye and consequently the bronzing phenomenon. With respect to the dye represented by the general formula (1) and contained in the water-based ink of the present teaching, however, only the alcoholamine, among the nitrogen-containing compounds, is effective at suppressing the bronzing phenomenon in a case that the alcoholamine is used in combination with the anionic surfactant having the sulfate structure. Even if the anionic surfactant having the sulfate structure is used in combination with other nitrogen-containing compound different from the alcoholamine, it is not possible to obtain any sufficient effect of suppressing the bronzing phenomenon with respect to the dye represented by the general formula (1). Further, in a case that only the alcoholamine is used without using the anionic surfactant having the sulfate structure, it is not possible to obtain any sufficient effect of suppressing the bronzing phenomenon if the alcoholamine is used in a small amount; and this case, although it is possible to obtain sufficient effect of suppressing the bronzing phenomenon if the alcoholamine is used in a large amount, the pH of the ink is increased. In order to suppress the increase in pH, it is necessary to add a pH-adjusting agent in a large amount. However, such addition of the pH-adjusting agent in a large amount results in lowering the evaporation property of water-based ink.

The anionic surfactant having the sulfate structure is also considered as contributing to the inhibition of the association of the dye represented by the general formula (1); even if a surfactant not having the sulfate structure is used in combination with the alcoholamine, it is not possible to obtain any sufficient effect of suppressing the bronzing phenomenon. Further, also in a case that the alcoholamine is not used and only the anionic surfactant having the sulfate structure is used, any sufficient effect of suppressing the bronzing phenomenon cannot be obtained.

Moreover, even in a case that the alcoholamine and the anionic surfactant having the sulfate structure are used in combination, any sufficient effect of suppressing the bronzing phenomenon cannot be obtained with respect to a dye different from the dye represented by the general formula (1). Since the bronzing phenomenon occurs due to the association of a dye contained in the water-based ink, it is presumed that a reagent capable of suppressing the association of a dye and a combination of reagents is different for every dye.

In the water-based ink of the present teaching, the dye represented by the general formula (1), the alcoholamine and the anionic surfactant having the sulfate structure are presumed to cause any interaction therebetween and to effectively suppress the association of the dye represented by the general formula (1). As described above, the inventor found out that the combination of the reagents capable of sufficiently suppressing the bronzing phenomenon in the water-based ink using the dye represented by the general formula (1).

In the present teaching, in particular, it is preferable that the alcoholamine ratio is made to be 0.2% by weight to 0.75% by weight and that the surfactant ratio is made to be 0.02% by weight to 0.2% by weight. By doing so, it is possible to further suppress the bronzing phenomenon and to obtain a water-based ink excellent in the after-evaporation fluidity.

The pH of the water-based ink is preferably 7 to 9. By making the pH be within this range, it is possible to obtain a water-based ink having excellent handling property. It is preferable that the water-based ink further includes a pH-adjusting agent. The pH-adjusting agent has, for example, a function of neutralizing the alcoholamine. Examples of the pH-adjusting agent include sulfuric acid, itaconic acid, L-glutamic acid, benzotriazole, oxalic acid, malonic acid, fumaic acid, succinic acid, glutaric acid, adipic acid, malic acid, phosphoric acid, citric acid, nitric acid, formic acid, propionic acid, glycolic acid, lactic acid, etc. Particularly in view of solubility in the water-based ink, it is preferable to use sulfuric acid, itaconic acid, L-glutamic acid and benzotriazole. Although the blending amount of the pH-adjusting agent (pH-adjusting agent ratio) may be appropriately adjusted based on the alcoholamine ratio described above, the pH-adjusting agent ratio is preferably not more than 2% by weight with respect to the entire amount of the water-based ink, and is more preferably 0.1% by weight to 0.9% by weight with respect to the entire amount of the water-based ink. By making the blending amount of the pH-adjusting agent within the above-described range, it is possible to adjust the pH of the water-based ink while maintaining the after-evaporation fluidity of the water-based ink.

The water-based ink may further contain a conventionally known additive, if necessary. The additive includes, for example, viscosity-adjusting agents, surface tension-adjusting agents, fungicides, etc. The viscosity-adjusting agents include, for example, polyvinyl alcohol, cellulose, water-soluble resin, etc.

The water-based ink can be prepared, for example, by mixing the colorant, the water, the water-soluble organic solvent, the alcoholamine, the anionic surfactant having the sulfate structure and optionally other additive component(s) as necessary uniformly or homogeneously with any conventionally known method, and by removing undissolved matters by a filter or the like.

Next, in the present teaching, the water-based ink for ink-jet recording can be provided also as an ink cartridge. The ink cartridge of the present teaching is, for example, an ink cartridge including (storing, accommodating) a water-based ink and the water-based ink is the water-based ink of the present teaching. As the body of the ink cartridge (ink-cartridge body), for example, it is allowable to use any conventionally known ink-cartridge body.

The water-based ink for ink jet recording of the present teaching as explained above is capable of suppressing the occurrence of the bronzing phenomenon sufficiently, and is also capable of avoiding any effect on the color of a recorded image which would be otherwise caused due to the polycyclic aromatic hetero conjugated compound.

Next, explanation will be given about an ink jet recording method and an ink-jet recording apparatus of the present teaching using the above-described water-based ink.

The ink-jet recording method of the present teaching is an ink jet recording method for performing recording on a recording medium by discharging a water-based ink by the ink-jet system (in the ink-jet manner) onto the recording medium, wherein the water-based ink for ink jet recording of the present teaching is used as the water-based ink.

The ink jet recording apparatus of the present teaching is an ink jet recording apparatus including an ink accommodating section and an ink discharge mechanism, and which discharges the water-based ink accommodated in the ink accommodating section by the ink discharge mechanism, wherein the water-based ink for ink jet recording of the present teaching is accommodated in the ink accommodating section.

The ink jet recording method of the present teaching can be practiced by, for example, using the ink-jet recording apparatus of the present teaching. The recording includes printing text (character, letter), printing image or picture, and printing, etc.

An example of the construction of the ink-jet recording apparatus of the present teaching is shown in FIG. 1. As shown in the drawing, an ink-jet recording apparatus 1 includes four ink cartridges 2, an ink jet discharge mechanism (ink-jet head) 3, a head unit 4, a carriage 5, a driving unit 6, a platen roller 7 and a purge device 8 as main constitutive components or parts.

The four ink cartridges 2 contain four colors of water-based inks respectively, the four colors being black, cyan, yellow and magenta. For example, the water-based cyan ink is the water-based ink of the present teaching. It is allowable to use general or commercially available water-based inks as the remaining inks other than the water-based cyan ink. The ink-jet head 3 disposed on the head unit 4 performs recording on a recording medium P such as a recording sheet (recording paper, recording paper sheet) P. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application Laid-open No. 2008-246821). The platen roller 7 extends in the reciprocating direction of the carriage 5 and is arranged to face or be opposite to the ink jet head 3.

The recording sheet P is supplied or fed, for example, from a paper feeding cassette or sheet feeding cassette (not shown) arranged at a side of or at a position below the ink jet recording apparatus 1. The recording paper P is introduced or guided between the ink-jet head 3 and the platen roller 7. Then, a predetermined recording is performed on the fed or introduced recording paper P with the ink discharged or jetted from the ink jet head 3. When the water-based ink of the present teaching in which the alcoholamine ratio is 0.2% by weight to 0.75% by weight and the surfactant ratio is 0.02% by weight to 0.2% by weight and which is excellent in the after-evaporation fluidity, the water-base ink does not lose the fluidity even when the ink is heated by the ink-jet head 3 and is evaporated, and thus has excellent discharge stability. The recording medium P on which the recording has been performed is discharged from the ink-jet recording apparatus 1. In the recorded matter recorded with the water-based ink of the present teaching, the occurrence of the bronzing phenomenon is sufficiently suppressed. Further, since the water-based ink of the present teaching does not use the above-described polycyclic aromatic hetero conjugated compound, the water-based ink does not affect the color of the recorded image. Note that in FIG. 1, a paper feeding mechanism and a discharging mechanism for the recording medium P are omitted.

The purge device 8 sucks or draws unsatisfactory ink (poor ink) which contains air bubbles, etc. accumulated or trapped in the ink-jet head 3. As the purge device 8, it is possible to use, for example, a conventionally known purge device (for example, see Japanese Patent Application laid-open No. 2008-246821).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 1, a cap 18 is provided to cover a plurality of nozzles of the ink jet head 3 which is returned to a reset position upon completion of the recording, so as to prevent the ink from drying.

In the ink-jet recording apparatus, the four ink cartridges may be provided on a plurality of carriages. Alternatively, the ink cartridges may be arranged and fixed inside the ink jet recording apparatus, rather than being provided on the carriage(s). In such an aspect, for example, the ink cartridges and the head unit which is provided on the carriage are connected with a tube, etc., and the inks are supplied from the ink cartridges to the head unit via the tube.

EXAMPLES

Next, examples of the present teaching will be explained together with comparative examples. Note that the present teaching is not limited and is not restricted to the examples and the comparative examples which will be described below.

Examples 1-11 and Comparative Examples 1-33

Respective components in the water-based ink composition (TABLE 1 to TABLE 3) were mixed uniformly or homogeneously. After that, obtained mixtures were filtrated through a membrane filter (pore size 0.20 μm) of the hydrophilic polytetrafluoroethylene (PTFE) type produced by Toyo Roshi Kaisha, Ltd. to thereby obtain water-based ink for ink-jet recording of Examples 1-11 and Comparative Examples 1-33. Note that in TABLE 1 to TABLE 3, dyes (1-A) to (1-E) are compounds which are represented by the above-described chemical formulae (1-A) to (1-E), respectively, each of which is blended as a 10% by weight-concentration aqueous solution and in which parenthesized numerical values are each an amount of the dyes (1-A)-(1-E) themselves. Note that in TABLE 1 to TABLE 3, triethanolamine and diethanolamine were used as the alcoholamine; "SUNNOL (trade name) NL-1430", "LIPON (trade name) LT-270", "LIPON (trade name) LS-250", "SUNNOL (trade name) LM-1130" which are produced by Lion Corporation and "PELEX (trade name) TR" produced by Kao Corporation were used as the anionic surfactant having the sulfate structure; and sulfuric acid, itaconic acid, L-glutamic acid and benzotriazole were used as the pH-adjusting agent.

Further, in TABLE 3, a dye (2) is a compound which is represented by the following chemical formula (2), which is blended as a 10.5% by weight-concentration aqueous solution and in which parenthesized numerical value is an amount of the dye (2) itself. Further, Pc (Cu) in the chemical formula (2) is copper phthalocyanine nucleus represented by the following general formula (Pc).

(Chemical Formula 2)

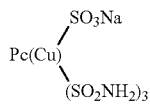

(2)

(Chemical Formula Pc)

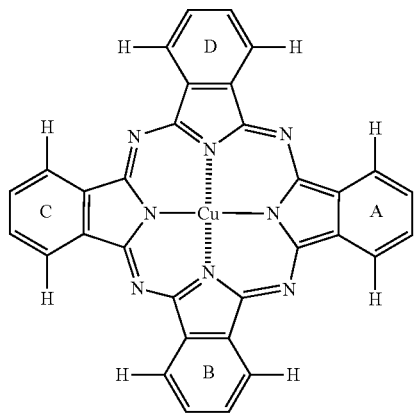

(Pc)

Next, the method for producing the dye (2) will be explained. The dye (2) may be produced, for example, by a conventionally known copper phthalocyanine substitution method as shown, for example, by the following steps (A) to (C).

Step (A)

First, a copper phthalocyanine compound is chlorosulfonated with a chlorosulfonating agent. Examples of the chlorosulfonating agent include a mixture of a chlorosulfonic acid and a chlorinating agent (phosphorous oxychloride or phosphorous trichloride); and the like. The molar ratio of the chlorosulfonic acid to the copper phthalocyanine compound (chlorosulfonic acid:copper phthalocyanine compound) is preferably about 5:1 to about 200:1. The molar ratio of the chlorinating agent to the copper phthalocyanine compound (chlorinating agent:copper phthalocyanine compound) is preferably about 0.5:1 to about 10:1.

This chlorosulfonation reaction is carried out, for example, at a temperature from about 90° C. to about 180° C. for about 0.5 hours to about 16 hours. Generally, the reaction time for the chlorosulfonation depends on the reaction temperature. The reaction time tends to be short as the reaction temperature is high, and the reaction time tends to be long as the reaction temperature is low. The chlorosulfonation reaction is preferably carried out at a temperature from about 135° C. to about 145° C. for about 1.5 hours to about 5.0 hours.

The chlorosulfonating agent may contain a sulfuric acid. In a case that the chlorosulfonating agent contains a sulfuric acid, the molar ratio of the sulfuric acid to the copper phthalocyanine compound (sulfuric acid:copper phthalocyanine compound) is about 0.3:1 to about 2:1.

Step (B)

Next, a compound represented by the following structural formula (21) is obtained by condensation reaction of the product obtained in the step (A) and ammonia.

(Chemical Structural Formula 21)

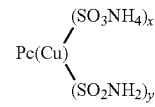

This step is carried out, for example, at a reaction temperature from about 0° C. to about 50° C. using about 3% by weight to about 35% by weight of ammonium hydroxide. Generally, the reaction time depends on the reaction temperature. The reaction time tends to be short as the reaction temperature is high, and the reaction time tends to be long as the reaction temperature is low. The condensation reaction is preferably carried out at a temperature from about 0° C. to about 45° C. for about 0.5 hour to about 24 hours.

Step (C)

Then, $NH_4^+$ in the compound represented by the structural formula (21) obtained in the step (B) is exchanged with a monovalent metal cation, if necessary. This metal cation exchange reaction may be carried out, for example, by the following method: the product obtained in the step (B) is acidified (for example, $NH_4^+$ is exchanged with $H^+$ using a hydrochloric acid), then the original cation is removed through dialysis, and then a monovalent metal cation is added (for example, an alkali metal hydroxide is added). In this manner, the dye (2) can be produced.

With respect to the water-based inks for ink jet recording of Examples 1-20 and Comparative Examples 1-20, (a) evaluation of bronzing (bronzing evaluation), (b) evaluation of fluidity after evaporation (after-evaporation fluidity) and (c) pH measurement were performed in the following manner.

(a) Bronzing Evaluation

A digital multifunction machine DCP-385C provided with an ink-jet printer produced by Brother Industries, Ltd. was used to print a single-color patch with the water-based ink of Examples 1-20 and Comparative Examples 1-20 on a glossy photo paper BP71G produced by Brother Industries, Ltd. at a resolution of 1200 dpi×2400 dpi, and evaluation samples were prepared; and 60-degree gloss of the single-color patch of each of Examples 1-20 and Comparative Examples 1-20 was measured by using a Handy Glossmeter HG-268 produced by Suga Test Instruments, Co., Ltd., and the bronzing evaluation were made for the evaluation samples based on the following evaluation criterion.

Evaluation Criterion of Bronzing

A: The 60-degree gloss was not more than 47.

B: The 60-degree gloss exceeded 47 and was not more than 52.

C: The 60-degree gloss exceeded 52 and was not more than 60.

D: The 60-degree gloss exceeded 60.

(b) Evaluation of after-Evaporation Fluidity 5 g of the water-based ink of each of Examples 1-20 and Comparative Examples 1-20 was poured into a open vial (opening size (diameter): 20.2 mm). The open vial was stored in a thermostatic chamber for 5 days at a temperature of 60° C. and a relative humidity of 40%. After the storage, the state of the water-based ink in the open vial was visually observed, and evaluations were made for the water-based inks based on the following evaluation criterion.

Evaluation Criterion of after-Evaporation Fluidity

A+: Fluidity was confirmed (the water-based ink was greatly moved when the open vial was inclined).

A: Fluidity was confirmed (the water-based ink was slightly moved when the open vial was inclined).

B+: Fluidity was confirmed (the water-based ink was greatly moved when the open vial was applied with impact).

B: Fluidity was confirmed (the water-based ink was slightly moved when the open vial was applied with impact).

C: Fluidity was not confirmed (the water-based ink was not moved even when the open vial was inclined and was applied with impact).

(c) pH Measurement

The pH of the water-based ink of each of Examples 1-20 and Comparative Examples 1-2 was measured by using a Compact pH meter produced by Horiba, Ltd.

The composition of the water-based ink of each of Examples 1-11 and the evaluation results therefor are shown in TABLE 1. The composition of the water-based ink of each of Comparative Examples 1-33 and the evaluation results therefor are shown in TABLE 2 and TABLE 3.

Note that in TABLE 1 and TABLE 2:

*1: Acetylene glycol-based surfactant (ethylene oxide (10 mol) adduct of acetylene diol), produced by Nissin Chemical Industry Co., Ltd.

*2: Fungicide produced by Arch Chemicals Japan, Inc.

*3: Anionic surfactant having sulfate structure; sodium polyoxyethylene (3 E.O.) alkyl (C=12, 13) ether sulfate, produced by Lion Corporation, active ingredient amount=28% by weight (parenthesized numerals indicate active ingredient amounts).

*4: Anionic surfactant having sulfate structure; triethanolamine linear (straight chain) (C10-14) benzene sulfonate, produced by Lion Corporation, active ingredient amount=70% by weight (parenthesized numerals indicate active ingredient amounts).

*5: Anionic surfactant having sulfate structure; sodium linear (C10-14) benzene sulfonate, produced by Lion Corporation, active ingredient amount=50% by weight (parenthesized numerals indicate active ingredient amounts).

*6: Anionic surfactant having sulfate structure; sodium lauryl sulfate, produced by Lion Corporation, active ingredient amount=33% by weight (parenthesized numerals indicate active ingredient amounts).

*7: Anionic surfactant having sulfate structure; sodium ditridecyl sulfosuccinate, produced by Kao Corporation, active ingredient amount=70% by weight (parenthesized numerals indicate active ingredient amounts).

Note that in TABLE 3:

*1: Acetylene glycol-based surfactant (ethylene oxide (10 mol) adduct of acetylene diol), produced by Nissin Chemical Industry Co., Ltd.

*2: Fungicide produced by Arch Chemicals Japan, Inc.

*3: Anionic surfactant having sulfate structure; sodium polyoxyethylene (3 E.O.) alkyl (C=12, 13) ether sulfate, produced by Lion Corporation, active ingredient amount=28% by weight (parenthesized numerals indicate active ingredient amounts).

*8: Anionic surfactant not having sulfate structure; linear (C10-14) benzene sulfonic acid, produced by Lion Corporation, active ingredient amount=96% by weight (parenthesized numerals indicate active ingredient amounts).

*9: Anionic surfactant not having sulfate structure; alkyl benzene sulfonic acid, produced by Lion Corporation, active ingredient amount=96% by weight (parenthesized numerals indicate active ingredient amounts).

*10: Anionic surfactant not having sulfate structure; sodium polyoxyethylene alkyl ether acetate, produced by Lion Corporation, active ingredient amount=30% by weight (parenthesized numerals indicate active ingredient amounts).

*11: Anionic surfactant not having sulfate structure; potassium oleate, produced by Kao Corporation, active ingredient amount=21% by weight (parenthesized numerals indicate active ingredient amounts).

*12: Anionic surfactant not having sulfate structure; sodium polyoxyethylene (10) lauryl ether acetate, produced by Kao Corporation, active ingredient amount=24% by weight (parenthesized numerals indicate active ingredient amounts).

*13: Anionic surfactant not having sulfate structure; sodium polyoxyethylene (4.5) lauryl ether acetate, produced by Kao Corporation, active ingredient amount=24% by weight (parenthesized numerals indicate active ingredient amounts).

TABLE 1

| | | EXAMPLES | | | | | |
| --- | --- | --- | --- | --- | --- | --- | --- |
| | | EX. 1 | EX. 2 | EX. 3 | EX. 4 | EX. 5 | EX. 6 |
| Composition of water-based ink (% by weight) | Dye (1-A) | — | — | 45.0 (4.50) | — | — | — |
| | Dye (1-B) | — | — | — | — | — | — |
| | Dye (1-C) | 45.0 (4.50) | — | — | 45.0 (4.50) | — | — |

TABLE 1-continued

| | | EX. 1 | EX. 2 | EX. 3 | EX. 4 | EX. 5 | EX. 6 |
|---|---|---|---|---|---|---|---|
| | Dye (1-D) | — | — | — | — | 45.0 (4.50) | — |
| | Dye (1-E) | — | 45.0 (4.50) | — | — | — | 45.0 (4.50) |
| | Glycerol (85% by weight concentration) | 17.00 | 17.00 | 17.00 | 17.00 | 17.00 | 17.00 |
| | Diethyelene glycol | 8.00 | 8.00 | 8.00 | 8.00 | 8.00 | 8.00 |
| | Triethylene glycol-n-butyl ether | 3.80 | 3.80 | 3.80 | 3.80 | 3.80 | 3.80 |
| | ORFIN (trade name) E1010 (*1) | 0.20 | 0.20 | 0.20 | 0.20 | 0.20 | 0.20 |
| | PROXEL (trade name) GXL(S) (*2) | 0.134 | 0.134 | 0.134 | 0.134 | 0.134 | 0.134 |
| | Triethanolamine | 0.75 | 0.30 | 0.30 | 0.30 | 0.30 | 0.30 |
| | Diethanolamine | — | — | — | — | — | — |
| | SUNNOL (trade name) NL-1430 (*3) | 0.071 (0.02) | — | — | — | — | — |
| | LIPON (trade name) LT-270 (*4) | — | 0.214 (0.15) | — | — | — | — |
| | LIPON (trade name) LS-250 (*5) | — | — | 0.30 (0.15) | — | — | — |
| | SUNNOL (trade name) LM-1130 (*6) | — | — | — | — | 0.45 (0.15) | 0.45 (0.15) |
| | PELEX (trade name) TR (*7) | — | — | — | 0.286 (0.20) | — | — |
| | Sulfuric acid (0.1 mol/L) | 0.80 | — | — | — | — | — |
| | Itaconic acid | — | 0.10 | 0.10 | 0.10 | — | — |
| | L-glutamic acid | — | — | — | — | 0.10 | — |
| | Benzotriazole | — | — | — | — | — | 0.10 |
| | water | balance | balance | balance | balance | balance | balance |
| Evaluation | Bronzing evaluation | A | A | A | A | A | A |
| | After-evaporation fluidity evaluation | A+ | A+ | A+ | A+ | A+ | A+ |
| pH | | 8.55 | 7.50 | 7.45 | 7.39 | 8.60 | 8.32 |

| | | EXAMPLES | | | | |
|---|---|---|---|---|---|---|
| | | EX. 7 | EX. 8 | EX. 9 | EX. 10 | EX. 11 |
| Composition of water-based ink (% by weight) | Dye (1-A) | — | — | — | — | — |
| | Dye (1-B) | 45.0 (4.50) | — | — | — | — |
| | Dye (1-C) | — | 45.0 (4.50) | 45.0 (4.50) | — | — |
| | Dye (1-D) | — | — | — | 45.0 (4.50) | — |
| | Dye (1-E) | — | — | — | — | 45.0 (4.50) |
| | Glycerol (85% by weight concentration) | 17.00 | 17.00 | 17.00 | 17.00 | 17.00 |
| | Diethyelene glycol | 8.00 | 8.00 | 8.00 | 8.00 | 8.00 |
| | Triethylene glycol-n-butyl ether | 3.80 | 3.80 | 3.80 | 3.80 | 3.80 |
| | ORFIN (trade name) E1010 (*1) | 0.20 | 0.20 | 0.20 | 0.20 | 0.20 |
| | PROXEL (trade name) GXL(S) (*2) | 0.134 | 0.134 | 0.134 | 0.134 | 0.134 |
| | Triethanolamine | — | — | 0.20 | 0.20 | 0.75 |
| | Diethanolamine | 0.75 | 0.75 | — | — | — |
| | SUNNOL (trade name) NL-1430 (*3) | — | — | — | 0.714 (0.20) | 0.714 (0.20) |
| | LIPON (trade name) LT-270 (*4) | — | — | 0.029 (0.02) | — | — |
| | LIPON (trade name) LS-250 (*5) | — | — | — | — | — |
| | SUNNOL (trade name) LM-1130 (*6) | — | — | — | — | — |
| | PELEX (trade name) TR (*7) | 0.143 (0.10) | 0.143 (0.10) | — | — | — |
| | Sulfuric acid (0.1 mol/L) | 0.90 | 0.50 | 0.10 | 0.10 | 0.80 |
| | Itaconic acid | — | — | — | — | — |
| | L-glutamic acid | — | — | — | — | — |
| | Benzotriazole | — | — | — | — | — |
| | water | balance | balance | balance | balance | balance |
| Evaluation | Bronzing evaluation | A | A | A | A | A |
| | After-evaporation fluidity evaluation | A+ | A+ | A+ | A+ | A+ |
| pH | | 8.66 | 9.38 | 7.68 | 7.61 | 8.48 |

TABLE 2

| | | COMPARATIVE EXAMPLES | | | | | |
|---|---|---|---|---|---|---|---|
| | | COM. EX.. 1 | COM. EX.. 2 | COM. EX.. 3 | COM. EX.. 4 | COM. EX.. 5 | COM. EX.. 6 |
| Composition of water-based ink | Dye (1-A) | 45.0 (4.50) | — | — | — | 45.0 (4.50) | — |

TABLE 2-continued

|  |  |  |  |  |  |  |  |
|---|---|---|---|---|---|---|---|
| (% by weight) | Dye (1-B) | — | 45.0 (4.50) | — | — | — | 45.0 (4.50) |
|  | Dye (1-C) | — | — | 45.0 (4.50) | — | — | — |
|  | Dye (1-D) | — | — | — | 45.0 (4.50) | — | — |
|  | Dye (1-E) | — | — | — | — | — | — |
|  | Glycerol (85% by weight concentration) | 17.00 | 17.00 | 17.00 | 17.00 | 17.00 | 17.00 |
|  | Diethyelene glycol | 8.00 | 8.00 | 8.00 | 8.00 | 8.00 | 8.00 |
|  | Triethylene glycol-n-butyl ether | 3.80 | 3.80 | 3.80 | 3.80 | 3.80 | 3.80 |
|  | ORFIN (trade name) E1010 (*1) | 0.20 | 0.20 | 0.20 | 0.20 | 0.20 | 0.20 |
|  | PROXEL (trade name) GXL(S) (*2) | 0.134 | 0.134 | 0.134 | 0.134 | 0.134 | 0.134 |
|  | Triethanolamine | 0.10 | 0.25 | 0.30 | 0.90 | 0.05 | 0.05 |
|  | Diethanolamine | — | — | — | — | — | — |
|  | SUNNOL (trade name) NL-1430 (*3) | 0.375 (0.10) | 0.892 (0.25) | 0.036 (0.01) | 0.357 (0.10) | 0.071 (0.02) | 1.43 (0.40) |
|  | LIPON (trade name) LT-270 (*4) | — | — | — | — | — | — |
|  | LIPON (trade name) LS-250 (*5) | — | — | — | — | — | — |
|  | SUNNOL (trade name) LM-1130 (*6) | — | — | — | — | — | — |
|  | PELEX (trade name) TR (*7) | — | — | — | — | — | — |
|  | Sulfuric acid (0.1 mol/L) | 0.10 | 0.10 | 0.10 | 1.00 | 0.20 | 0.20 |
|  | Itaconic acid | — | — | — | — | — | — |
|  | L-glutamic acid | — | — | — | — | — | — |
|  | Benzotriazole | — | — | — | — | — | — |
|  | water | balance | balance | balance | balance | balance | balance |
| Evaluation | Bronzing evaluation | B | B | B | A | B | B |
|  | After-evaporation fluidity evaluation | A | A | A | B | A | A |
| pH |  | 8.56 | 8.67 | 8.87 | 8.55 | 7.50 | 7.52 |

|  |  | COMPARATIVE EXAMPLES | | | | | | |
|---|---|---|---|---|---|---|---|---|
|  |  | COM. EX.. 7 | COM. EX.. 8 | COM. EX.. 9 | COM. EX.. 10 | COM. EX.. 11 | COM. EX.. 12 | COM. EX.. 13 |
| Composition of water-based ink (% by weight) | Dye (1-A) | — | — | 45.0 (4.50) | — | — | 45.0 (4.50) | — |
|  | Dye (1-B) | — | 45.0 (4.50) | — | — | — | — | 45.0 (4.50) |
|  | Dye (1-C) | — | — | — | — | — | — | — |
|  | Dye (1-D) | 45.0 (4.50) | — | — | 45.0 (4.50) | — | — | — |
|  | Dye (1-E) | — | — | — | — | 45.0 (4.50) | — | — |
|  | Glycerol (85% by weight concentration) | 17.00 | 17.00 | 17.00 | 17.00 | 17.00 | 17.00 | 17.00 |
|  | Diethyelene glycol | 8.00 | 8.00 | 8.00 | 8.00 | 8.00 | 8.00 | 8.00 |
|  | Triethylene glycol-n-butyl ether | 3.80 | 3.80 | 3.80 | 3.80 | 3.80 | 3.80 | 3.80 |
|  | ORFIN (trade name) E1010 (*1) | 0.20 | 0.20 | 0.20 | 0.20 | 0.20 | 0.20 | 0.20 |
|  | PROXEL (trade name) GXL(S) (*2) | 0.134 | 0.134 | 0.134 | 0.134 | 0.134 | 0.134 | 0.134 |
|  | Triethanolamine | 0.75 | 0.30 | — | 1.00 | 1.00 | 0.30 | 0.50 |
|  | Diethanolamine | — | — | 0.05 | — | — | — | — |
|  | SUNNOL (trade name) NL-1430 (*3) | 1.43 (0.40) | — | — | 1.43 (0.40) | 1.43 (0.40) | 1.79 (0.50) | 1.79 (0.50) |
|  | LIPON (trade name) LT-270 (*4) | — | — | — | — | — | — | — |
|  | LIPON (trade name) LS-250 (*5) | — | — | — | — | — | — | — |
|  | SUNNOL (trade name) LM-1130 (*6) | — | 1.20 (0.40) | — | — | — | — | — |
|  | PELEX (trade name) TR (*7) | — | — | 0.286 (0.20) | — | — | — | — |
|  | Sulfuric acid (0.1 mol/L) | 0.80 | — | 0.40 | 1.20 | 1.20 | 0.10 | — |
|  | Itaconic acid | — | 0.10 | — | — | — | — | — |
|  | L-glutamic acid | — | — | — | — | — | — | — |
|  | Benzotriazole | — | — | — | — | — | — | — |
|  | water | balance | balance | balance | balance | balance | balance | balance |
| Evaluation | Bronzing evaluation | A | B | B | A | A | B | A |
|  | After-evaporation fluidity evaluation | A | A | A | B | B | A | A |
| pH |  | 8.51 | 7.36 | 8.78 | 8.25 | 8.22 | 7.62 | 9.86 |

TABLE 3

|  |  | COMPARATIVE EXAMPLES | | | | |
|---|---|---|---|---|---|---|
|  |  | COM. EX.. 14 | COM. EX.. 15 | COM. EX.. 16 | COM. EX.. 17 | COM. EX.. 18 |
| Composition of water-based ink | Dye (1-A) | 45.0 (4.50) | — | — | — | — |

TABLE 3-continued

|  |  |  |  |  |  |  |
|---|---|---|---|---|---|---|
| (% by weight) | Dye (1-B) | — | 45.0 (4.50) | — | — | — |
|  | Dye (1-C) | — | — | 45.0 (4.50) | — | — |
|  | Dye (1-D) | — | — | — | 45.0 (4.50) | — |
|  | Dye (1-E) | — | — | — | — | 45.0 (4.50) |
|  | Dye (2) | — | — | — | — | — |
|  | Glycerol (85% by weight concentration) | 17.00 | 17.00 | 17.00 | 17.00 | 17.00 |
|  | Diethyelene glycol | 8.00 | 8.00 | 8.00 | 8.00 | 8.00 |
|  | Triethylene glycol-n-butyl ether | 3.80 | 3.80 | 3.80 | 3.80 | 3.80 |
|  | ORFIN (trade name) E1010 (*1) | 0.20 | 0.20 | 0.20 | 0.20 | 0.20 |
|  | PROXEL (trade name) GXL(S) (*2) | 0.134 | 0.134 | 0.134 | 0.134 | 0.134 |
|  | Triethanolamine | — | 0.05 | 0.75 | — | — |
|  | 2-pyrrolidone | — | — | — | — | — |
|  | N-methyl-2-pyrrolidone | — | — | — | — | — |
|  | 1-(2-hydroxyl)2-pyrrolidone | — | — | — | — | — |
|  | 1,3-dimethyl-2-imidazolidinone | — | — | — | — | — |
|  | Urea | — | — | — | — | — |
|  | SUNNOL (trade name) NL-1430 (*3) | — | — | — | 0.071 (0.02) | 1.43 (0.40) |
|  | LIPON (trade name) LH-200 (*8) | — | — | — | — | — |
|  | LIPON (trade name) LH-900 (*9) | — | — | — | — | — |
|  | ENAGICOL (trade name) EC-30 (*10) | — | — | — | — | — |
|  | FR-14 (*11) | — | — | — | — | — |
|  | AKYPO (trade name) RLM-100NV (*12) | — | — | — | — | — |
|  | AKYPO (trade name) RLM-45NV (*13) | — | — | — | — | — |
|  | Sulfuric acid (0.1 mol/L) | — | 0.20 | 0.80 | — | — |
|  | Benzotriazole | — | — | — | — | — |
|  | water | balance | balance | balance | balance | balance |
| Evaluation | Bronzing evaluation | D | D | C | D | C |
|  | After-evaporation fluidity evaluation | B+ | B+ | A | B+ | B+ |
| pH |  | 8.12 | 7.48 | 8.60 | 8.13 | 8.12 |

|  |  | COMPARATIVE EXAMPLES | | | | |
|---|---|---|---|---|---|---|
|  |  | COM. EX.. 19 | COM. EX.. 20 | COM. EX.. 21 | COM. EX.. 22 | COM. EX.. 23 |
| Composition of water-based ink (% by weight) | Dye (1-A) | 45.0 (4.50) | — | — | — | — |
|  | Dye (1-B) | — | 45.0 (4.50) | — | — | — |
|  | Dye (1-C) | — | — | 45.0 (4.50) | — | — |
|  | Dye (1-D) | — | — | — | 45.0 (4.50) | — |
|  | Dye (1-E) | — | — | — | — | 45.0 (4.50) |
|  | Dye (2) | — | — | — | — | — |
|  | Glycerol (85% by weight concentration) | 17.00 | 17.00 | 17.00 | 17.00 | 17.00 |
|  | Diethyelene glycol | 8.00 | 8.00 | 8.00 | 8.00 | 8.00 |
|  | Triethylene glycol-n-butyl ether | 3.80 | 3.80 | 3.80 | 3.80 | 3.80 |
|  | ORFIN (trade name) E1010 (*1) | 0.20 | 0.20 | 0.20 | 0.20 | 0.20 |
|  | PROXEL (trade name) GXL(S) (*2) | 0.134 | 0.134 | 0.134 | 0.134 | 0.134 |
|  | Triethanolamine | — | — | — | 0.10 | 0.10 |
|  | 2-pyrrolidone | — | — | — | — | — |
|  | N-methyl-2-pyrrolidone | — | — | — | — | — |
|  | 1-(2-hydroxyl)2-pyrrolidone | — | — | — | — | — |
|  | 1,3-dimethyl-2-imidazolidinone | — | — | — | — | — |
|  | Urea | — | — | — | — | — |
|  | SUNNOL (trade name) NL-1430 (*3) | 2.14 (0.60) | 1.43 (0.40) | 1.43 (0.40) | — | — |
|  | LIPON (trade name) LH-200 (*8) | — | — | — | 0.208 (0.20) | — |
|  | LIPON (trade name) LH-900 (*9) | — | — | — | — | 0.208 (0.20) |
|  | ENAGICOL (trade name) EC-30 (*10) | — | — | — | — | — |
|  | FR-14 (*11) | — | — | — | — | — |
|  | AKYPO (trade name) RLM-100NV (*12) | — | — | — | — | — |
|  | AKYPO (trade name) RLM-45NV (*13) | — | — | — | — | — |
|  | Sulfuric acid (0.1 mol/L) | — | — | — | — | — |
|  | Benzotriazole | — | 0.10 | — | 0.10 | 0.10 |
|  | water | balance | balance | balance | balance | balance |
| Evaluation | Bronzing evaluation | D | C | C | D | D |
|  | After-evaporation fluidity evaluation | B+ | A | A | A | A |
| pH |  | 8.15 | 8.85 | 8.16 | 8.43 | 8.47 |

TABLE 3-continued

| | | COMPARATIVE EXAMPLES | | | | |
|---|---|---|---|---|---|---|
| | | COM. EX. 24 | COM. EX. 25 | COM. EX. 26 | COM. EX. 27 | COM. EX. 28 |
| Composition of water-based ink (% by weight) | Dye (1-A) | 45.0 (4.50) | — | — | — | — |
| | Dye (1-B) | — | 45.0 (4.50) | — | — | — |
| | Dye (1-C) | — | — | 45.0 (4.50) | — | — |
| | Dye (1-D) | — | — | — | 45.0 (4.50) | — |
| | Dye (1-E) | — | — | — | — | 45.0 (4.50) |
| | Dye (2) | — | — | — | — | — |
| | Glycerol (85% by weight concentration) | 17.00 | 17.00 | 17.00 | 17.00 | 17.00 |
| | Diethyelene glycol | 8.00 | 8.00 | 8.00 | 8.00 | 8.00 |
| | Triethylene glycol-n-butyl ether | 3.80 | 3.80 | 3.80 | 3.80 | 3.80 |
| | ORFIN (trade name) E1010 (*1) | 0.20 | 0.20 | 0.20 | 0.20 | 0.20 |
| | PROXEL (trade name) GXL(S) (*2) | 0.134 | 0.134 | 0.134 | 0.134 | 0.134 |
| | Triethanolamine | 0.10 | 0.10 | 0.10 | 0.10 | — |
| | 2-pyrrolidone | — | — | — | — | 0.10 |
| | N-methyl-2-pyrrolidone | — | — | — | — | — |
| | 1-(2-hydroxyl)2-pyrrolidone | — | — | — | — | — |
| | 1,3-dimethyl-2-imidazolidinone | — | — | — | — | — |
| | Urea | — | — | — | — | — |
| | SUNNOL (trade name) NL-1430 (*3) | — | — | — | — | 0.714 (0.20) |
| | LIPON (trade name) LH-200 (*8) | — | — | — | — | — |
| | LIPON (trade name) LH-900 (*9) | — | — | — | — | — |
| | ENAGICOL (trade name) EC-30 (*10) | 0.667 (0.20) | — | — | — | — |
| | FR-14 (*11) | — | 0.952 (0.20) | — | — | — |
| | AKYPO (trade name) RLM-100NV (*12) | — | — | 0.833 (0.20) | — | — |
| | AKYPO (trade name) RLM-45NV (*13) | — | — | — | 0.833 (0.20) | — |
| | Sulfuric acid (0.1 mol/L) | — | — | — | — | — |
| | Benzotriazole | 0.10 | 0.10 | 0.10 | 0.10 | — |
| | water | balance | balance | balance | balance | balance |
| Evaluation | Bronzing evaluation | D | D | D | D | D |
| | After-evaporation fluidity evaluation | A | A | A | A | A |
| pH | | 8.44 | 8.39 | 8.47 | 8.46 | 8.26 |

| | | COMPARATIVE EXAMPLES | | | | |
|---|---|---|---|---|---|---|
| | | COM. EX. 29 | COM. EX. 30 | COM. EX. 31 | COM. EX. 32 | COM. EX. 33 |
| Composition of water-based ink (% by weight) | Dye (1-A) | 45.0 (4.50) | — | — | — | — |
| | Dye (1-B) | — | 45.0 (4.50) | — | — | — |
| | Dye (1-C) | — | — | 45.0 (4.50) | — | — |
| | Dye (1-D) | — | — | — | 45.0 (4.50) | — |
| | Dye (1-E) | — | — | — | — | — |
| | Dye (2) | — | — | — | — | 45.0 (4.50) |
| | Glycerol (85% by weight concentration) | 17.00 | 17.00 | 17.00 | 17.00 | 17.00 |
| | Diethyelene glycol | 8.00 | 8.00 | 8.00 | 8.00 | 8.00 |
| | Triethylene glycol-n-butyl ether | 3.80 | 3.80 | 3.80 | 3.80 | 3.80 |
| | ORFIN (trade name) E1010 (*1) | 0.20 | 0.20 | 0.20 | 0.20 | 0.20 |
| | PROXEL (trade name) GXL(S) (*2) | 0.134 | 0.134 | 0.134 | 0.134 | 0.134 |
| | Triethanolamine | — | — | — | — | 0.30 |
| | 2-pyrrolidone | — | — | — | — | — |
| | N-methyl-2-pyrrolidone | 0.10 | — | — | — | — |
| | 1-(2-hydroxyl)2-pyrrolidone | — | 0.10 | — | — | — |
| | 1,3-dimethyl-2-imidazolidinone | — | — | 0.10 | — | — |
| | Urea | — | — | — | 0.10 | — |
| | SUNNOL (trade name) NL-1430 (*3) | 0.714 (0.20) | 0.714 (0.20) | 0.714 (0.20) | 0.714 (0.20) | 0.714 (0.20) |
| | LIPON (trade name) LH-200 (*8) | — | — | — | — | — |
| | LIPON (trade name) LH-900 (*9) | — | — | — | — | — |
| | ENAGICOL (trade name) EC-30 (*10) | — | — | — | — | — |

TABLE 3-continued

|  |  |  |  |  |  |  |
|---|---|---|---|---|---|---|
|  | FR-14 (*11) | — | — | — | — | — |
|  | AKYPO (trade name) RLM-100NV (*12) | — | — | — | — | — |
|  | AKYPO (trade name) RLM-45NV (*13) | — | — | — | — | — |
|  | Sulfuric acid (0.1 mol/L) | — | — | — | — | — |
|  | Benzotriazole | — | — | 0.10 | — | 0.10 |
|  | water | balance | balance | balance | balance | balance |
| Evaluation | Bronzing evaluation | D | D | D | D | D |
|  | After-evaporation fluidity evaluation | A | A | A | A | A |
| pH |  | 8.33 | 8.35 | 8.32 | 8.09 | 8.41 |

As shown in TABLE 1, the water-based ink of each of Examples 1-11 contained the dye represented by the general formula (1), the alcoholamine and the anionic surfactant having the sulfate structure; and the alcoholamine ratio was 0.2% by weight to 0.75% by weight and the ratio of the anionic surfactant having the sulfate structure was 0.02% by weight to 0.2% by weight. The water-based ink of Examples 1-11 had "A" result of the bronzing evaluation and "A+" result of the evaluation of after-evaporation fluidity, sufficiently suppressing the occurrence of the bronzing phenomenon and having excellent evaluation result of the after-evaporation fluidity. In the water-based ink of each of Examples 1-11, in which the pH-adjusting agent ratio was not more than 0.90% by weight, the pH-adjusting agent ratio in the inks of Examples 1-11 is considered also as affecting the excellent result of evaluation of after-evaporation fluidity. Further, the water-based ink of each of Examples 1-7 and 9-11 in which the pH was 7 to 9 particularly was excellent in safety in view of being handled by an operator or worker and being used by an user.

As shown in TABLE 2, although the water-based ink of each of Comparative Examples 1-13 contained the dye represented by the general formula (1), the alcoholamine and the anionic surfactant having the sulfate structure, the alcoholamine ratio was outside the range of 0.2% by weight to 0.75% by weight and/or the ratio of the anionic surfactant having the sulfate structure was outside the range of 0.02% by weight to 0.2% by weight. The water-based ink of each of Comparative Examples 1-13 had "A" or "B" result of the bronzing evaluation and "A" or "B" result of the evaluation of after-evaporation fluidity that were inferior as compared with the evaluation results of the water-based inks of Examples 1-11. On the other hand, the water-based ink of each of Comparative Examples 1-3, 5-9, 12 and 13, in which the pH-adjusting agent ratio was not more than 0.90% by weight, had "A" result of the after-evaporation fluidity that was superior as compared with the water-based inks of Comparative Examples 4, 10 and 11 in which the pH-adjusting agent ratio was greater than 0.90% by weight. Further, the water-based ink of each of Comparative Examples 1-12 in which the pH was 7 to 9 was particularly excellent in the safety in view of being handled by an operator and being used by an user.

On the other hand, as shown in TABLE 3, the water-based ink of Comparative Example 14 in which the alcoholamine and the surfactant having the sulfate structure were not used had "D" result of the bronzing evaluation and did not sufficiently suppress the occurrence of the bronzing phenomenon.

Further, the water-based inks of Comparative Examples 15 and 16 in each of which the alcoholamine was used but the anionic surfactant having the sulfate structure was not used had "D" and "C" results of the bronzing evaluation, respectively, and did not sufficiently suppress the occurrence of the bronzing phenomenon.

Furthermore, the water-based inks of Comparative Examples 17 to 21 in each of which the anionic surfactant having the sulfate structure was used but the alcoholamine was not used had "D" or "C" result of the bronzing evaluation, and did not sufficiently suppress the occurrence of the bronzing phenomenon.

Moreover, the water-based inks of Comparative Examples 22 to 27 in each of which the anionic surfactant not having the sulfate structure was used together with the alcoholamine had "D" result of the bronzing evaluation, and did not sufficiently suppress the occurrence of the bronzing phenomenon.

Further, the water-based inks of Comparative Examples 28 to 32 in each of which the nitrogen-containing compound different from the alcoholamine was used together with the anionic surfactant having the sulfate structure had "D" result of the bronzing evaluation, and did not sufficiently suppress the occurrence of the bronzing phenomenon.

Furthermore, the water-based ink of Comparative Example 33 in which the copper phthalocyanine-based dye (dye (2)) which was different from the dye represented by the general formula (1) was used had "D" result of the bronzing evaluation, and did not sufficiently suppress the occurrence of the bronzing phenomenon even though the alcoholamine and the anionic surfactant having the sulfate structure were used.

From the results of the examples and the comparative examples, it is appreciated that the occurrence of the bronzing phenomenon in the water-based ink using the dye represented by the general formula (1) is sufficiently suppressed by using the alcoholamine and the anionic surfactant having the sulfate structure in combination.

As described above, the water-based ink of the present teaching is capable of suppressing the occurrence of the bronzing phenomenon and does not affect the color of recorded image. The usage of water-based ink of the present teaching is not particularly limited; and the water-based ink is widely applicable to a variety of kinds of ink jet recording.

What is claimed is:

1. A water-based ink for ink-jet recording, comprising:
    water;
    a water-soluble organic solvent;
    alcoholamine which is contained at 0.2% by weight to 0.75% by weight in the water-based ink for ink-jet recording;
    an anionic surfactant having a sulfate structure which is contained at 0.02% by weight to 0.2% by weight in the water-based ink for ink jet recording; and
    a colorant including a dye represented by general formula (1):

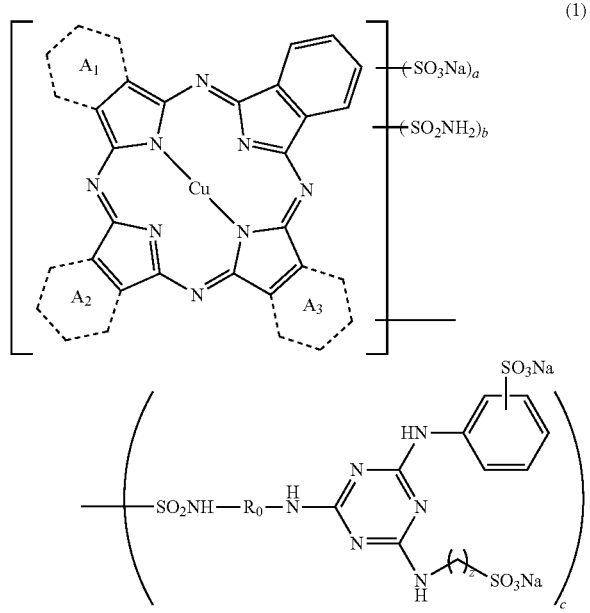

(1)

wherein each of rings $A_1$, $A_2$ and $A_3$ is a benzene ring, 2,3-pyridine ring or 3,2-pyridine ring;

at least one of the rings $A_1$, $A_2$ and $A_3$ is the 2,3-pyridine ring or the 3,2-pyridine ring, and the rings $A_1$, $A_2$ and $A_3$ are identical to or different from one another;

"a" satisfies $0 \leq a \leq 4$, "b" satisfies $0 \leq b \leq 4$ and "c" satisfies $0 \leq c \leq 4$, and a sum of "a", "b", "c" satisfies $0 \leq a+b+c \leq 4$;

"z" is an integer satisfying $1 \leq z \leq 3$; and $R_0$ is a straight chain alkyl group having 1 to 6 carbon atoms.

2. The water-based ink for ink jet recording according to claim 1, wherein the dye represented by the general formula (1) is contained not more than 5% by weight in the water-based ink for ink-jet recording.

3. The water-based ink for ink jet recording according to claim 1, wherein pH of the water-based ink for ink jet recording is not more than 7 to not less than 9.

4. The water-based ink for ink jet recording according to claim 3, further comprising a pH-adjusting agent.

5. The water-based ink for ink jet recording according to claim 1, wherein the alcoholamine is triethanolamine or diethanolamine.

6. The water-based ink for ink jet recording according to claim 4, wherein the pH-adjusting agent is sulfuric acid, itaconic acid, L-glutamic acid or benzotriazole.

7. The water-based ink for ink jet recording according to claim 1, wherein the water-based ink for ink-jet recording is a water-based cyan ink.

8. An ink jet recording method for performing recording on a recording medium, comprising:
providing the water-based ink for ink jet recording as defined in claim 1; and
discharging, to the recording medium, the water-based ink.

9. An ink-jet recording apparatus which performs recording on a recording medium, comprising:
an ink accommodating section which accommodates the water-based ink for ink-jet recording as defined in claim 1; and
an ink discharge mechanism which discharges, to the recording medium, the water-based ink for ink jet recording accommodated in the ink accommodating section.

* * * * *